US 12,488,912 B2

(12) United States Patent
Zhou et al.

(10) Patent No.: US 12,488,912 B2
(45) Date of Patent: Dec. 2, 2025

(54) STANDARD FOR NEAR END CROSSTALK OF CATEGORY 6A CABLE (CAT 6A)

(71) Applicant: National Institute of Metrology,China, Beijing (CN)

(72) Inventors: Xin Zhou, Beijing (CN); Tong Wu, Beijing (CN); Qingfei Shen, Beijing (CN); Yao Yao, Beijing (CN); Wei Tang, Beijing (CN); Chao Fu, Beijing (CN); Anxiang Li, Beijing (CN); Xinhua Pang, Beijing (CN)

(73) Assignee: National Institute of Metrology, China, Beijing (CN)

( * ) Notice: Subject to any disclaimer, the term of this patent is extended or adjusted under 35 U.S.C. 154(b) by 473 days.

(21) Appl. No.: 18/177,449

(22) Filed: Mar. 2, 2023

(65) Prior Publication Data
US 2023/0207155 A1    Jun. 29, 2023

(30) Foreign Application Priority Data

Oct. 20, 2022    (CN) .......................... 202211289592.4

(51) Int. Cl.
*H01B 11/04* (2006.01)
*H01B 11/12* (2006.01)
*H01R 24/56* (2011.01)

(52) U.S. Cl.
CPC .......... *H01B 11/04* (2013.01); *H01B 11/125* (2013.01); *H01R 24/568* (2013.01)

(58) Field of Classification Search
None
See application file for complete search history.

(56) References Cited

U.S. PATENT DOCUMENTS

| 2009/0298344 A1* | 12/2009 | Pyczak | H01R 13/6469 439/629 |
| 2012/0100744 A1* | 4/2012 | Bolouri-Saransar | H01R 12/675 716/122 |
| 2014/0273660 A1* | 9/2014 | Wachtel | H05K 1/0228 439/676 |

FOREIGN PATENT DOCUMENTS

| CN | 108028481 A | 5/2018 |
| CN | 113904968 A | 1/2022 |

* cited by examiner

*Primary Examiner* — Hemant S Patel

(57) ABSTRACT

A standard for near end crosstalk of a category 6A cable, including a registered jack 45 (RJ45), a clamp connected to the RJ45, a first attenuator and a second attenuator. The RJ45 includes a first signal twisted pair to transmit a first source signal and a second source signal, and a second signal twisted pair to transmit a third source signal and a fourth source signal. The clamp includes a first signal pair connector electrically connected to the first signal twisted pair, a second signal pair connector electrically connected to the second signal twisted pair, a first differential amplification circuit and a second differential amplification circuit. The first attenuator is electrically connected to the first signal pair connector. The second attenuator is electrically connected to the second signal pair connector. The second attenuator and the first attenuator are configured to detect the near end crosstalk.

10 Claims, 4 Drawing Sheets

STANDARD FOR NEAR END CROSSTALK OF CATEGORY 6A CABLE (CAT 6A)

CROSS-REFERENCE TO RELATED APPLICATIONS

This application claims the benefit of priority from Chinese Patent Application No. 202211289592.4, filed on Oct. 20, 2022. The content of the aforementioned application, including any intervening amendments thereto, is incorporated herein by reference in its entirety.

TECHNICAL FIELD

This application relates to cable analyzers, and more particularly to a standard for near end crosstalk of a category 6A cable (CAT 6A).

BACKGROUND

Network cable analyzer plays an indispensable role in the network cabling, failure elimination, and network maintenance, and is also employed in the certification of a cabling system to determine whether the connectivity and transmission performances thereof meet the requirements of local, national or international standards. The network cable analyzer must be calibrated/verified to enable accurate and reliable quality test of the network cabling. Parameters of the network cable analyzer include near end crosstalk (NEXT), equal level near end crosstalk, far-end crosstalk, equal level far-end crosstalk, insertion loss, propagation delay, and length, where the near end crosstalk is considered as one of the most critical parameters since it is unique to the network cable analyzer, and thus must be correctly calibrated. The near end crosstalk refers to signal coupling generated from a transmitting pair at the near-end into adjacent (receiving) pairs at the near-end by electromagnetic induction in a link. The principle of measuring the near end crosstalk is illustrated in FIG. 1. Specifically, when a signal sent from a transmitting pair is transmitted along the cable, a crosstalk component on the adjacent (receiving) pair at the same side is captured by the analyzer.

FIG. 2 structurally shows a calibration device of the NEXT in the prior art (recommended by JJF 1494-2014 "Calibration Specification for Network Cable Analyzers"), which includes a network cable analyzer, an impedance converter, and a precision step attenuator for testing near end crosstalk between 1,2-pair and 3,6-pair. The network cable analyzer is connected to the precision step attenuator via the impedance converter.

Though the existing NEXT calibration device enables the calibration of the NEXT between pairs, the impedance converter is expensive, and is limited by the purchase limitation of high-performance balun, resulting in difficult implementation, especially in the large-scale test verification.

SUMMARY

An objective of this application is to provide a standard for near end crosstalk of a category 6A cable (CAT 6A) to provide at least one useful commercial alternative for solving the above-mentioned technical problems. Regarding the standard provided herein, a specifically-designed clamp is adopted to convert the registered jack 45 (RJ45) interface into eight common subminiature version A (SMA) connectors, and the clamp is provided with a differential circuit for realizing the impedance conversion. Consequently, the standard not only realizes the calibration of the near end crosstalk between the pairs, but also replaces the expensive impedance convertor with SMA connectors, so as to reduce the cost and facilitate the large-scale promotion and application.

Technical solutions of this application are described as follows.

This application provides a standard for near end crosstalk of an augmented category 6 cable (CAT 6A), comprising:
a registered jack 45 (RJ45);
a clamp;
a first attenuator; and
a second attenuator;
wherein the RJ45 comprises at least one first signal twisted pair and a second signal twisted pair; the at least one first signal twisted pair is configured to transmit a first source signal and a second source signal; and the second signal twisted pair is configured to transmit a third source signal and a fourth source signal;
the clamp is connected to the RJ45; the clamp comprises at least one first signal pair connector and a second signal pair connector; the at least one first signal pair connector is electrically connected to the at least one first signal twisted pair; the second signal pair connector is electrically connected to the second signal twisted pair; the clamp further comprises a first differential amplification circuit and a second differential amplification circuit; the first differential amplification circuit is configured to perform differential operation on the first source signal and the second source signal, so as to convert an impedance of the at least one first signal twisted pair; and the second differential amplification circuit is configured to perform differential operation on the third source signal and the fourth source signal, so as to convert an impedance of the second signal twisted pair;
the first attenuator is electrically connected to the at least one first signal pair connector; and
the second attenuator is electrically connected to the second signal pair connector; and the second attenuator and the first attenuator are configured to measure near end crosstalk between the at least one first signal twisted pair and the second signal twisted pair.

Regarding the standard provided herein, a specifically-designed clamp is adopted to convert the RJ45 interface into eight common SMA connectors, and the clamp is provided with a differential circuit for realizing the impedance conversion. Consequently, the standard not only realizes the calibration of the near end crosstalk between the twisted wire pairs, but also replaces the expensive impedance convertor with SMA connectors, so as to reduce the cost and facilitate the large-scale promotion and application.

In addition, the standard for near end crosstalk of a CAT 6A provided herein further has the following additional technical features.

In an embodiment, the clamp comprises a mainboard; the mainboard is electrically connected to the RJ45; the mainboard is provided with a plurality of first subminiature version A (SMA) connectors; the plurality of first SMA connectors are electrically connected to the mainboard; each of the at least one first signal pair connector comprises a second SMA connector and a third SMA connector; and the second signal pair connector comprises a fourth SMA connector and a fifth SMA connector.

In an embodiment, a first end of the first attenuator is electrically connected to the second SMA connector, and a second end of the first attenuator is electrically connected to the fourth SMA connector; and a first end of the second attenuator is electrically connected to the third SMA connector, and a second end of the second attenuator is electrically connected to the fifth SMA connector.

In an embodiment, the first end of the first attenuator is electrically connected to the second SMA connector via a first SMA connector wire, and the second end of the first attenuator is electrically connected to the fourth SMA connector via a second SMA connector wire; and the first end of the second attenuator is electrically connected to the third SMA connector via a third SMA connector wire, and the second end of the second attenuator is electrically connected to the fifth SMA connector via a fourth SMA connector wire.

In an embodiment, the RJ45 comprises a transmitted signal twisted pair, a received signal twisted pair, a first spare signal twisted pair and a second spare signal twisted pair; the plurality of first SMA connectors comprise a transmitted signal SMA connector pair, a received signal SMA connector pair, a first spare signal SMA connector pair and a second spare signal SMA connector pair; the transmitted signal twisted pair is electrically connected to the transmitted signal SMA connector pair; the received signal twisted pair is electrically connected to the received signal SMA connector pair; the first spare signal twisted pair is electrically connected to the first spare signal SMA connector pair; and the second spare signal twisted pair is electrically connected to the second spare signal SMA connector pair.

In an embodiment, the transmitted signal twisted pair comprises a transmitted positive signal wire and a transmitted negative signal wire; the received signal twisted pair comprises a received positive signal wire and a received negative signal wire; the first spare signal twisted pair comprises a first spare signal wire and a second spare signal wire; and the second spare signal twisted pair comprises a third spare signal wire and a fourth spare signal wire.

In an embodiment, the transmitted signal SMA connector pair comprises a transmitted positive signal SMA connector, a transmitted negative signal SMA connector; the received signal SMA connector pair comprises a received positive signal SMA connector and a received negative signal SMA connector; the first spare signal SMA connector pair comprises a first spare signal SMA connector and a second spare signal SMA connector; and the second spare signal SMA connector pair comprises a third spare signal SMA connector and a fourth spare signal SMA connector.

In an embodiment, the transmitted positive signal SMA connector, the transmitted negative signal SMA connector, the received positive signal SMA connector, the received negative signal SMA connector, the first spare signal SMA connector, the second spare signal SMA connector, the third spare signal SMA connector and the fourth spare signal SMA connector are provided on side edges of the mainboard at equal interval.

In an embodiment, the first attenuator and the second attenuator have the same attenuation value.

In an embodiment, the first attenuator and the second attenuator each comprise a coaxial attenuator.

Additional aspects and beneficial effects of this application will become more apparent from the following description, or from the implementation of the technical solutions of this application.

BRIEF DESCRIPTION OF THE DRAWINGS

In order to make the technical solutions and beneficial effects clearly illustrated and better understood, this application will be described below with reference to the accompanying drawings and embodiments.

DETAILED DESCRIPTION OF EMBODIMENTS

This application will be described in detail below with reference to the embodiments. The embodiments are exemplarily shown in the accompanying drawings. The same or similar reference signs indicate the same or similar components or components having the same or similar functions. The embodiments described below with reference to the accompanying drawings are exemplary and are intended to explain this application, and not to limit this application.

Figure 1:
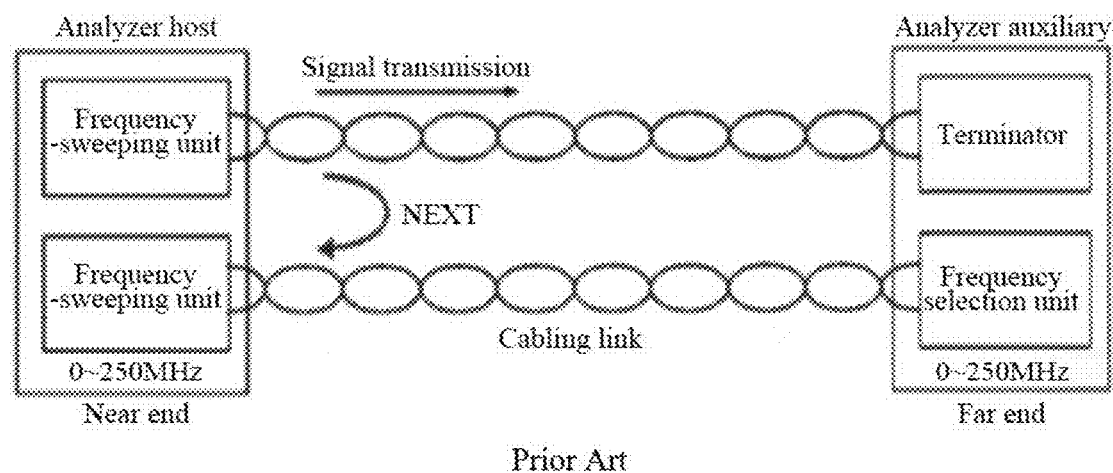
FIG. 1 shows a principle of measuring near end crosstalk (NEXT) in the prior art.
Figure 2:
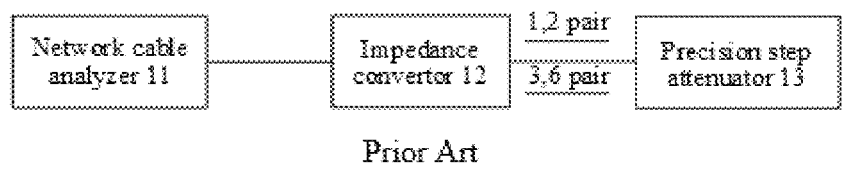
FIG. 2 structurally shows a calibration device of the NEXT in the prior art.
Figure 3:
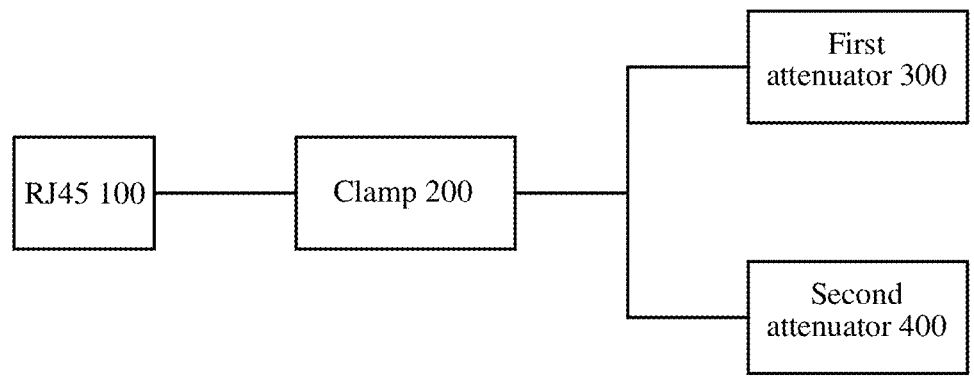
FIG. 3 is a block diagram of a calibration device of the NEXT according to an embodiment of this application.
Figure 4:
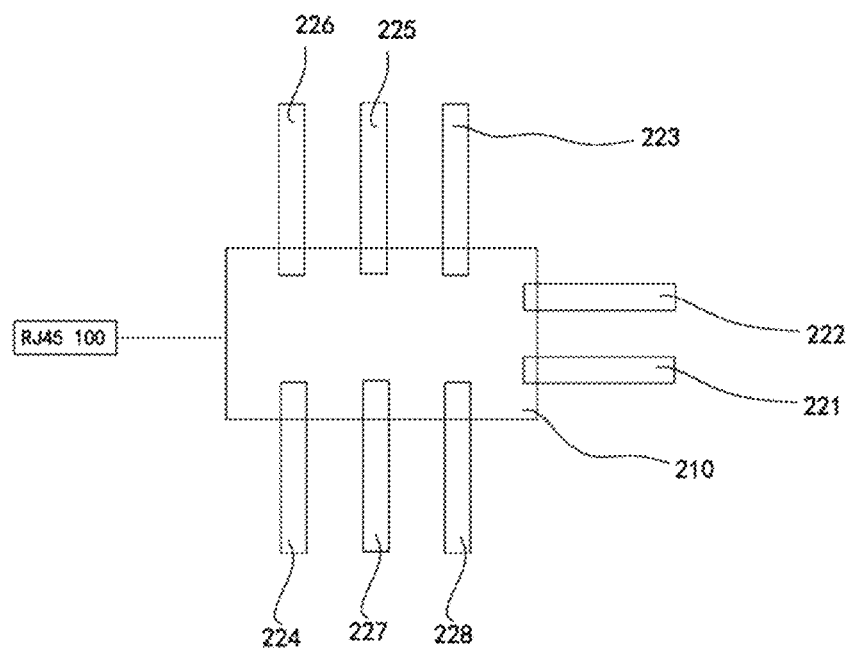
FIG. 4 is a structural diagram of a clamp according to an embodiment of this application.

FIG. 3 structurally shows a calibration device of the near end crosstalk (NEXT) according to an embodiment of this application, and FIG. 4 is a structural diagram of a clamp according to an embodiment of this application. Referring to FIGS. 3-4, a standard is provided for NEXT of a CAT 6A, which can be applied to the calibration of the NEXT between the twisted pairs.

CAT 6A refers to an augmented category 6A cable. Twisted pair refers to a most commonly-used transmission media in the comprehensive cabling project. The twisted pair is composed of two copper conducting wires, both of which are protected by insulation protection layer. The two copper conducting wires protected by insulation protection layer are twisted with each other according to a certain density. During transmission, the electric wave radiated by one of the two copper conducting wires will be canceled by the electric wave radiated by the other of the two copper conducting wires, effectively reducing the signal interference.

Referring to FIGS. 3 and 4, the standard provided herein includes a registered jack 45 (RJ45) 100, a clamp 200, a first attenuator 300 and a second attenuator 400.

RJ45 100 refers to a registered jack 45 (8-position 8-contact, 8P8C), which is one of the telecommunication outlet connectors in cabling systems. The connector consists of a plug (connector, crystal head) and a jack (module). The plug and the jack form a connector for connection among conducting wires to realize electrical continuity of the conducting wires.

The RJ45 100 includes at least one first signal twisted pair and second signal twisted pair. The first signal twisted pair is configured to transmit a first source signal and a second source signal. The second signal twisted pair is configured to transmit a third source signal and a fourth source signal. For example, the RJ45 100 at least includes a transmitted signal twisted pair and a received signal twisted pair. The transmitted signal twisted pair further includes a transmitted positive signal wire and a transmitted negative signal wire. The received signal twisted pair includes a received positive signal wire and a received negative signal wire. The transmitted positive signal wire is configured to transmit the first source signal, e.g., an S+ signal. The transmitted negative signal wire is configured to transmit the second source signal, e.g., an S− signal. The received positive signal wire is configured to transmit the third source signal, e.g., an R+ signal. The received negative signal wire is configured to transmit the fourth source signal, e.g., an R− signal. In other embodiments, the RJ45 100 also includes a spare signal twisted pair, for example, two groups of spare signal twisted pairs may be included in RJ45.

The clamp 200 is connected to the RJ45 100. The clamp 200 includes at least one first signal pair connector and a second signal pair connector. The at least one first signal pair connector is electrically connected to the at least one first signal twisted pair. The second signal pair connector is electrically connected to the second signal twisted pair. Specifically, the at least one first signal twisted pair of the RJ45 100 is electrically connected to the at least one first signal pair connector of the clamp 200, and the second signal twisted pair of the RJ45 100 is electrically connected to the second signal pair connector of the clamp 200, such that the RJ45 is electrically connected to the clamp 200.

The clamp 200 further includes a first differential amplification circuit and a second differential amplification circuit. The first differential amplification circuit is configured to perform differential operation on the first source signal and the second source signal to convert an impedance of the at least one first signal twisted pair. Specifically, the first differential amplification circuit and the second differential amplification circuit may be integrated on the clamp 200. The first differential amplification circuit is configured to perform differential operation on the S+ signal transmitted by the transmitted positive signal wire and the S− signal transmitted by the transmitted negative signal wire, so as to enable the conversion between the impedance of the transmitted positive signal wire and the impedance of the transmitted negative signal wire. For example, the transmitted positive signal wire and the transmitted negative signal wire each have the impedance of 50Ω. The first differential amplification circuit is configured to perform differential operation on the S+ signal and the S− signal, that is, calculating a difference by subtracting the S− signal from the S+ signal. In this way, the S+ signal and the S− signal are measured together, and the equivalent measurement of the two input signals of the S+ signal and the S− signal are realized, thereby realizing the combined conversion. Based on the same method, the second differential amplification circuit is configured to perform differential operation on the R+ signal and the R− signal, so as to convert an impedance of the second signal twisted pair. Compared with the high-cost impedance convertor applied in the existing technologies, the standard provided herein is provided with differential circuits to realize the impedance conversion by differentiate operation, thereby reducing the cost.

The first attenuator 300 is electrically connected to the at least one first signal pair connector of the clamp 200. The second attenuator 400 is electrically connected to the second signal pair connector of the clamp 200. The second attenuator 400 cooperates with the first attenuator 300 to measure the near end crosstalk between the at least one first signal twisted pair and the second signal twisted pair. Specifically, the at least one first signal pair connector of the clamp 200 is connected to the at least one first signal twisted pair of the RJ45 100 and the first attenuator 300, respectively. The second signal pair connector of the clamp 200 is electrically connected to the second signal twisted pair of the RJ45 100 and the second attenuator 400, respectively. Consequently, the calibration and verification of the near end crosstalk between the at least one first signal twisted pair and the second signal twisted pair is realized. Compared to the prior art involving the use of expensive impedance converters, this application has lower cost, and is more suitable for the large-scale promotion and application.

Referring to an embodiment shown in FIG. 4, the clamp 200 includes a mainboard 210. The mainboard 210 is configured for electrical connection with the RJ45 100. In the specific implementation, an outer plastic layer of the twisted pair in the RJ45 100 is allowed to be peeled off, and the exposed copper conducting wires inside the twisted pair are fixed to a connecting finger of the mainboard 210 by tin soldering, thereby realizing the electrical connection between the mainboard 210 and the RJ45 100.

The mainboard 210 is provided with a plurality of subminiature version A (SMA) connectors. The plurality of SMA connectors remain to be electrically connected to the mainboard 210. The mainboard 210 is also provided with the at least one first signal pair connector and the second signal pair connector. The at least one first signal pair connector includes a first SMA connector 221 and a second SMA connector 222. The second signal pair connector includes a third SMA connector 223 and a fourth SMA connector 224. Specifically, the first SMA connector 221, the second SMA connector 222, the third SMA connector 223 and the fourth SMA connector 224 may be each fixedly or detachably provided on the mainboard 210, and remain electrically connected to the mainboard 210. In this embodiment, the first SMA connector 221, the second SMA connector 222, the third SMA connector 223 and the fourth SMA connector 224 are each electrically connected to the mainboard 210. In this embodiment, the first SMA connector 221, the second SMA connector 222, the third SMA connector 223 and the fourth SMA connector 224 are fixedly provided on the mainboard 210 by welding, and electrically connected to the mainboard 210.

In the specific implementation, a first end of the first attenuator 300 is electrically connected to the first SMA connector 221, and a second end of the first attenuator 300 is electrically connected to the third SMA connector 223. A first end of the second attenuator 300 is electrically connected to the second SMA connector 222, and a second end of the second attenuator 300 is electrically connected to the fourth SMA connector 224. With regard to the standard provided herein, two ends of the first attenuator 300 are respectively connected to the first SMA connector 221 and the third SMA connector 223, and two ends of the second attenuator 300 are respectively connected to the second SMA connector 222 and the fourth SMA connector 224, such that the first attenuator 300 and the second attenuator are configured to calibrate the near end crosstalk between the at least one first signal twisted pair and the second signal twisted pair.

In the specific implementation, the first end of the first attenuator 300 is electrically connected to the first SMA connector 221 via a first SMA connector wire. The second end of the first attenuator 300 is electrically connected to the third SMA connector 223 via a second SMA connector wire. The first end of the second attenuator 400 is electrically connected to the second SMA connector 222 via a third SMA connector wire. The second end of the second attenuator 400 is electrically connected to the second SMA connector 224 via a fourth SMA connector wire. Specifically, regarding the standard provided herein, the first attenuator 300 is electrically connected to two SMA connectors on the main board 210 via two SMA connector wires, respectively, so as to realize electrical connection between the first attenuator 300 and the mainboard 210. The second attenuator 400 is electrically connected to two SMA connectors on the main board 210 via two SMA connector wires, respectively, so as to realize electrical connection between the second attenuator 400 and the mainboard 210.

Referring to an embodiment shown in FIG. 4, the RJ45 100 includes a transmitted signal twisted pair, a received signal twisted pair, a first spare signal twisted pair and a second spare signal twisted pair. The plurality of SMA connectors include a transmitted signal SMA connector pair, a received signal SMA connector pair, a first spare signal SMA connector pair and a second spare signal SMA connector pair. The transmitted signal twisted pair is electrically connected to the transmitted signal SMA connector pair. The received signal twisted pair is electrically connected to the received signal SMA connector pair. The first spare signal twisted pair is electrically connected to the first spare signal SMA connector pair. The second spare signal twisted pair is electrically connected to the second spare signal SMA connector pair. Specifically, the standard provided herein allows a plurality of twisted pairs of signals in the RJ45 to be in one-to-one correspondence with a plurality of SMA connectors, so as to realize the electrical connection between the RJ45 100 and the plurality of SMA connectors, thereby facilitating the subsequent calibration of the near end crosstalk among different twisted pairs.

In an embodiment, the transmitted signal twisted pair includes a transmitted positive signal wire and a transmitted negative signal wire. The received signal twisted pair includes a received positive signal wire and a received negative signal wire. The first spare signal twisted pair includes a first spare signal wire and a second spare signal wire. The second spare signal twisted pair includes a third spare signal wire and a fourth spare signal wire. Specifically, in this embodiment, each signal twisted pair includes two signal twisted wires.

Referring to an embodiment shown in FIG. 4, the transmitted signal SMA connector pair includes a transmitted positive signal SMA connector 221 and a transmitted negative signal SMA connector 222. The received signal SMA connector pair includes a received positive signal SMA connector 223 and a received negative signal SMA connector 224. The first spare signal SMA connector pair includes a first spare signal SMA connector 225 and a second spare signal SMA connector 226. The second spare signal SMA connector pair includes a third spare signal SMA connector 227 and a fourth spare signal SMA connector 228. As shown in FIG. 4, the transmitted positive signal SMA connector 221, the transmitted negative signal SMA connector 222, the received positive signal SMA connector 223 and the first spare signal SMA connector 225, the second spare signal SMA connector 226, the received negative signal SMA connector 224, the third spare signal SMA connector 227 and the fourth spare signal SMA connector 228 are provided on edges of the mainboard 210 in sequence along a counterclockwise direction from a bottom right corner of the mainboard 210.

Referring to an embodiment shown in FIG. 4, the transmitted positive signal SMA connector 221, the transmitted negative signal SMA connector 222, the received positive signal SMA connector 223, the received negative signal SMA connector 224, the first spare signal SMA connector 225, the second spare signal SMA connector 226, the third spare signal SMA connector 227 and the fourth spare signal SMA connector 228 are provided on side edges of the mainboard 210 at equal space. Specifically, with respect to the standard provided herein, eight SMA connectors are provided on a side edge of the mainboard 210 evenly spaced apart, facilitating the electrical connection between different SMA connectors and the first attenuator 300 or/and the second attenuator 400, and avoiding the unsmooth connection between the SMA connectors and the first attenuator 300 or/and the second attenuator 400 caused by the excessively close distance between the two adjacent SMA connector.

In an embodiment, the first attenuator 300 and the second attenuator 400 have the same attenuation value. Specifically, in this embodiment, when the near end crosstalk between the transmitted signal twisted pair and the received signal twisted pair of the RJ45 is tested, the first attenuator 300 is connected between the transmitted positive signal SMA connector 221 and the received positive signal SMA connector 223, and the second attenuator 400 is connected between the transmitted negative signal SMA connector 222 and the received negative signal SMA connector 224. The first attenuator 300 and the second attenuator 400 are set to have the same attenuation value, that is, an analog value of the near end crosstalk, so as to achieve the calibration of the near end crosstalk between the transmitted signal twisted pair and the received signal twisted pair.

In an embodiment, the first attenuator 300 and the second attenuator 400 each include a coaxial attenuator. In this embodiment, the first attenuator 300 and the second attenuator 400 can be respectively arranged as a coaxial attenuator. For example, a coaxial attenuator (AS-SMA-25-1-50, L3 Narda-MITEQ) can be employed. In other embodiments, the first attenuator 300 and the second attenuator 400 can also be other attenuators, such as displacement-type optical attenuator, etc.

In this disclosure, the terms such as "one embodiment", "some embodiments", "example", "specific example", or "some examples", etc., mean that the specific feature, structure, material or feature described with reference to the embodiment or example is included in at least one embodiment or example of this application. In this disclosure, the exemplary description of the above-mentioned terms is not necessarily directed to the same embodiment or example. Moreover, the specific features, structures, materials or characteristics may be appropriately combined in any one or more embodiments or examples.

Described above are merely illustrative of the technical solutions of this application to enable those skilled in the art to understand and implement this application, which should not be construed as limitations of this application. It should be understood that any changes, modifications, replacements or variations made by those skilled in the art without departing from the spirit of the application shall fall within the scope of the present application defined by the appended claims.

What is claimed is:

1. A standard for near end crosstalk of a category 6A cable (CAT 6A), comprising:
   a registered jack 45 (RJ45);
   a clamp;
   a first attenuator; and
   a second attenuator;
   wherein the RJ45 comprises at least one first signal twisted pair and a second signal twisted pair; the at least one first signal twisted pair is configured to transmit a first source signal and a second source signal; and the second signal twisted pair is configured to transmit a third source signal and a fourth source signal;
   the clamp is connected to the RJ45; the clamp comprises at least one first signal pair connector and a second signal pair connector; the at least one first signal pair connector is electrically connected to the at least one first signal twisted pair; the second signal pair connector is electrically connected to the second signal twisted pair; the clamp further comprises a first differential amplification circuit and a second differential amplification circuit; the first differential amplification circuit is configured to perform differential operation on the first source signal and the second source signal, so as to convert an impedance of the at least one first signal twisted pair; and the second differential amplification circuit is configured to perform differential operation on the third source signal and the fourth source signal, so as to convert an impedance of the second signal twisted pair;

the first attenuator is electrically connected to the at least one first signal pair connector; and the second attenuator is electrically connected to the second signal pair connector; and the second attenuator and the first attenuator are configured to measure near end crosstalk between the at least one first signal twisted pair and the second signal twisted pair.

2. The standard of claim 1, wherein the clamp further comprises a mainboard; the mainboard is electrically connected to the RJ45; the mainboard is provided with a plurality of first subminiature version A (SMA) connectors; the plurality of first SMA connectors are electrically connected to the mainboard; each of the at least one first signal pair connector comprises a second SMA connector and a third SMA connector; and the second signal pair connector comprises a fourth SMA connector and a fifth SMA connector.

3. The standard of claim 2, wherein a first end of the first attenuator is electrically connected to the second SMA connector, and a second end of the first attenuator is electrically connected to the fourth SMA connector; and a first end of the second attenuator is electrically connected to the third SMA connector, and a second end of the second attenuator is electrically connected to the fifth SMA connector.

4. The standard of claim 3, wherein the first end of the first attenuator is electrically connected to the second SMA connector via a first SMA connector wire, and the second end of the first attenuator is electrically connected to the fourth SMA connector via a second SMA connector wire; and the first end of the second attenuator is electrically connected to the third SMA connector via a third SMA connector wire, and the second end of the second attenuator is electrically connected to the fifth SMA connector via a fourth SMA connector wire.

5. The standard of claim 2, wherein the RJ45 comprises a transmitted signal twisted pair, a received signal twisted pair, a first spare signal twisted pair and a second spare signal twisted pair; the plurality of first SMA connectors comprise a transmitted signal SMA connector pair, a received signal SMA connector pair, a first spare signal SMA connector pair and a second spare signal SMA connector pair; the transmitted signal twisted pair is electrically connected to the transmitted signal SMA connector pair; the received signal twisted pair is electrically connected to the received signal SMA connector pair; the first spare signal twisted pair is electrically connected to the first spare signal SMA connector pair; and the second spare signal twisted pair is electrically connected to the second spare signal SMA connector pair.

6. The standard of claim 5, wherein the transmitted signal twisted pair comprises a transmitted positive signal wire and a transmitted negative signal wire; the received signal twisted pair comprises a received positive signal wire and a received negative signal wire; the first spare signal twisted pair comprises a first spare signal wire and a second spare signal wire; and the second spare signal twisted pair comprises a third spare signal wire and a fourth spare signal wire.

7. The standard of claim 6, wherein the transmitted signal SMA connector pair comprises a transmitted positive signal SMA connector, a transmitted negative signal SMA connector; the received signal SMA connector pair comprises a received positive signal SMA connector and a received negative signal SMA connector; the first spare signal SMA connector pair comprises a first spare signal SMA connector and a second spare signal SMA connector; and the second spare signal SMA connector pair comprises a third spare signal SMA connector and a fourth spare signal SMA connector.

8. The standard of claim 7, wherein the transmitted positive signal SMA connector, the transmitted negative signal SMA connector, the received positive signal SMA connector, the received negative signal SMA connector, the first spare signal SMA connector, the second spare signal SMA connector, the third spare signal SMA connector and the fourth spare signal SMA connector are provided on side edges of the mainboard at equal interval.

9. The standard of claim 1, wherein the first attenuator and the second attenuator have the same attenuation value.

10. The standard of claim 1, wherein the first attenuator and the second attenuator each comprise a coaxial attenuator.

* * * * *